(12) United States Patent
Polonsky et al.

(10) Patent No.: US 10,102,278 B2
(45) Date of Patent: Oct. 16, 2018

(54) METHODS AND SYSTEMS FOR MODIFYING A USER PROFILE FOR A RECOMMENDATION ALGORITHM AND MAKING RECOMMENDATIONS BASED ON USER INTERACTIONS WITH ITEMS

(71) Applicant: Gartner, Inc., Stamford, CT (US)

(72) Inventors: Nir Polonsky, Ridgefield, CT (US); Girish Malangi, Bridgewater, NJ (US); Kevin Volpe, East Haven, CT (US)

(73) Assignee: Gartner, Inc., Stamford, CT (US)

( * ) Notice: Subject to any disclaimer, the term of this patent is extended or adjusted under 35 U.S.C. 154(b) by 112 days.

(21) Appl. No.: 14/046,229

(22) Filed: Oct. 4, 2013

(65) Prior Publication Data

US 2014/0108395 A1   Apr. 17, 2014
US 2017/0316088 A9   Nov. 2, 2017

Related U.S. Application Data

(63) Continuation-in-part of application No. 13/528,029, filed on Jun. 20, 2012, now Pat. No. 8,661,034, which is a continuation-in-part of application No. 12/658,192, filed on Feb. 3, 2010.

(60) Provisional application No. 61/712,470, filed on Oct. 11, 2012.

(51) Int. Cl.
*G06F 7/00* (2006.01)
*G06F 17/30* (2006.01)

(52) U.S. Cl.
CPC .. *G06F 17/30699* (2013.01); *G06F 17/30035* (2013.01); *G06F 17/3097* (2013.01); *G06F 17/30702* (2013.01)

(58) Field of Classification Search
None
See application file for complete search history.

(56) References Cited

U.S. PATENT DOCUMENTS

| | | | |
|---|---|---|---|
| 5,528,748 A | 6/1996 | Wallace | |
| 5,983,214 A | 11/1999 | Lang et al. | |
| 6,029,161 A | 2/2000 | Lang et al. | |
| 6,078,916 A * | 6/2000 | Culliss | G06F 17/30696 |
| 6,078,928 A | 6/2000 | Schnase et al. | |
| 6,112,186 A * | 8/2000 | Bergh | G06F 17/30699 |
| | | | 705/14.37 |
| 6,175,842 B1 | 1/2001 | Kirk et al. | |
| 6,236,978 B1 | 5/2001 | Tuzhilin | |

(Continued)

*Primary Examiner* — David T. Brooks
(74) *Attorney, Agent, or Firm* — Lipsitz & McAllister, LLC (57) ABSTRACT

Methods and apparatus for modifying a user profile for a recommendation algorithm are provided. A user is provided with electronic access to an item. The item may comprise one of a document, an article, a chart, a graphic, a report, a web page, or the like. User interaction with the item is enabled. The user interaction with the item is then electronically tracked and stored. The user's user profile used by a recommendation engine is then modified based on the tracked user interactions. The user interaction may comprise at least one of annotating, highlighting, modifying, customizing, adding comments to the item, and the like. The user modified item can be saved and details of the user interaction with the item may be used to modify the user profile. At least one of items or peer recommendations can then be provided to the user based on the modified user profile.

22 Claims, 8 Drawing Sheets

(56) References Cited

U.S. PATENT DOCUMENTS

| | | | |
|---|---|---|---|
| 6,236,980 B1 | 5/2001 | Reese | |
| 6,266,649 B1 | 7/2001 | Linden et al. | |
| 6,308,175 B1 | 10/2001 | Lang et al. | |
| 6,314,420 B1 | 11/2001 | Lang et al. | |
| 6,389,372 B1 | 5/2002 | Glance et al. | |
| 6,438,579 B1* | 8/2002 | Hosken | G06F 17/30867 |
| | | | 707/999.002 |
| 6,981,214 B1* | 12/2005 | Miller | G06F 17/30867 |
| | | | 705/14.61 |
| 7,016,307 B2 | 3/2006 | Vasudev et al. | |
| 7,035,838 B2 | 4/2006 | Nelson et al. | |
| 7,043,443 B1 | 5/2006 | Firestone | |
| 7,047,202 B2 | 5/2006 | Jaipuria et al. | |
| 7,069,308 B2 | 6/2006 | Abrams | |
| 7,167,910 B2 | 1/2007 | Farnham et al. | |
| 7,177,880 B2 | 2/2007 | Ruvolo et al. | |
| 7,188,153 B2 | 3/2007 | Lunt et al. | |
| 7,249,123 B2 | 7/2007 | Elder et al. | |
| 7,269,590 B2 | 9/2007 | Hull et al. | |
| 7,275,102 B2 | 9/2007 | Yeager et al. | |
| 7,315,826 B1 | 1/2008 | Guheen et al. | |
| 7,359,894 B1 | 4/2008 | Liebman et al. | |
| 7,451,161 B2 | 11/2008 | Zhu et al. | |
| 7,454,433 B2 | 11/2008 | Ebert | |
| 7,499,903 B2 | 3/2009 | Nevin et al. | |
| 7,506,001 B2 | 3/2009 | Johnson et al. | |
| 7,512,628 B2 | 3/2009 | Chess et al. | |
| 7,657,907 B2 | 2/2010 | Fennan et al. | |
| 7,680,820 B2 | 3/2010 | Denoue et al. | |
| 7,917,503 B2 | 3/2011 | Mowatt et al. | |
| 7,966,316 B2 | 6/2011 | Cao et al. | |
| 8,060,463 B1* | 11/2011 | Spiegel | G06Q 30/02 |
| | | | 707/609 |
| 8,184,797 B1 | 5/2012 | Osen | |
| 8,244,674 B2 | 8/2012 | Davis et al. | |
| 8,311,835 B2 | 11/2012 | Lecoeuche | |
| 8,484,149 B1* | 7/2013 | Kelly | G06Q 10/00 |
| | | | 706/46 |
| 8,903,811 B2 | 12/2014 | Hueter et al. | |
| 9,143,578 B2 | 9/2015 | Fourman | |
| 9,165,305 B1* | 10/2015 | Chandra | G06F 17/30041 |
| 9,235,848 B1 | 1/2016 | Gourley et al. | |
| 2002/0087632 A1 | 7/2002 | Keskar | |
| 2002/0104087 A1* | 8/2002 | Schaffer | H04N 7/163 |
| | | | 725/46 |
| 2002/0194018 A1 | 12/2002 | Scott | |
| 2003/0093294 A1 | 5/2003 | Passantino | |
| 2003/0220913 A1 | 11/2003 | Doganata et al. | |
| 2004/0015329 A1 | 1/2004 | Shayegan et al. | |
| 2004/0024739 A1 | 2/2004 | Copperman et al. | |
| 2004/0039814 A1 | 2/2004 | Crabtree et al. | |
| 2004/0073918 A1 | 4/2004 | Ferman et al. | |
| 2004/0128301 A1* | 7/2004 | Thint | G06F 17/30867 |
| 2005/0050227 A1 | 3/2005 | Michelman | |
| 2005/0076365 A1* | 4/2005 | Popov | H04N 7/163 |
| | | | 725/46 |
| 2005/0154701 A1 | 7/2005 | Parunak et al. | |
| 2005/0182743 A1 | 8/2005 | Koenig | |
| 2005/0216457 A1* | 9/2005 | Walther | G06F 17/30696 |
| 2005/0240580 A1 | 10/2005 | Zamir et al. | |
| 2006/0085373 A1 | 4/2006 | Dhillion et al. | |
| 2006/0136589 A1* | 6/2006 | Konig | G06F 17/30867 |
| | | | 709/224 |
| 2006/0179112 A1 | 8/2006 | Weyer et al. | |
| 2006/0200432 A1* | 9/2006 | Flinn | G06N 5/048 |
| | | | 706/12 |
| 2006/0200434 A1 | 9/2006 | Flinn et al. | |
| 2006/0282304 A1 | 12/2006 | Bedard et al. | |
| 2006/0294085 A1* | 12/2006 | Rose | G06F 17/30616 |
| 2007/0016553 A1* | 1/2007 | Dumais | H04L 51/34 |
| 2007/0043720 A1 | 2/2007 | Koenig et al. | |
| 2007/0060109 A1 | 3/2007 | Ramer et al. | |
| 2007/0143281 A1* | 6/2007 | Smirin | G06F 17/30867 |
| 2007/0162355 A1* | 7/2007 | Tabin | G06Q 30/0629 |
| | | | 705/26.64 |
| 2007/0203790 A1* | 8/2007 | Torrens | G06Q 30/02 |
| | | | 705/14.69 |
| 2007/0239610 A1* | 10/2007 | Lemelson | G06Q 10/00 |
| | | | 705/51 |
| 2007/0277093 A1* | 11/2007 | Joshi | G06F 17/241 |
| | | | 715/230 |
| 2008/0005075 A1 | 1/2008 | Horvitz et al. | |
| 2008/0005103 A1 | 1/2008 | Ratcliffe et al. | |
| 2008/0046555 A1 | 2/2008 | Datta et al. | |
| 2008/0077461 A1 | 3/2008 | Glick | |
| 2008/0077574 A1* | 3/2008 | Gross | G06F 17/30699 |
| 2008/0104004 A1 | 5/2008 | Brave et al. | |
| 2008/0104030 A1 | 5/2008 | Choi et al. | |
| 2008/0208852 A1* | 8/2008 | Kuttikkad | G06Q 30/02 |
| 2008/0209350 A1* | 8/2008 | Sobotka | G06F 3/0482 |
| | | | 715/762 |
| 2008/0215623 A1 | 9/2008 | Ramer et al. | |
| 2008/0243827 A1 | 10/2008 | Sarma et al. | |
| 2008/0288494 A1 | 11/2008 | Brogger et al. | |
| 2008/0288573 A1* | 11/2008 | Bellotti | G06F 17/30041 |
| | | | 709/201 |
| 2008/0294607 A1 | 11/2008 | Partovi et al. | |
| 2009/0018851 A1 | 1/2009 | Greenfield | |
| 2009/0031030 A1 | 1/2009 | Schmidt | |
| 2009/0089751 A1 | 4/2009 | Raikes et al. | |
| 2009/0100047 A1 | 4/2009 | Jones et al. | |
| 2009/0112837 A1* | 4/2009 | Modani | G06F 17/30864 |
| 2009/0163183 A1* | 6/2009 | O'Donoghue | G06Q 30/02 |
| | | | 455/414.1 |
| 2009/0254838 A1* | 10/2009 | Rao | G06F 17/30702 |
| | | | 715/749 |
| 2009/0276368 A1 | 11/2009 | Martin et al. | |
| 2009/0299812 A1 | 12/2009 | Ray | |
| 2010/0005411 A1* | 1/2010 | Duncker | G06F 17/30873 |
| | | | 715/769 |
| 2010/0030764 A1* | 2/2010 | Koren | G06Q 30/0201 |
| | | | 705/7.29 |
| 2010/0105315 A1 | 4/2010 | Albrett | |
| 2010/0106668 A1* | 4/2010 | Hawthorne | G06Q 10/10 |
| | | | 706/11 |
| 2010/0145937 A1 | 6/2010 | Davis et al. | |
| 2010/0169148 A1 | 7/2010 | Oberhofer et al. | |
| 2010/0205541 A1 | 8/2010 | Rapaport et al. | |
| 2010/0250341 A1* | 9/2010 | Hauser | G06F 17/30867 |
| | | | 707/769 |
| 2010/0250578 A1* | 9/2010 | Athsani | G06F 17/30029 |
| | | | 707/765 |
| 2010/0287033 A1* | 11/2010 | Mathur | G06F 17/30867 |
| | | | 705/319 |
| 2011/0113094 A1 | 5/2011 | Chunilal | |
| 2011/0162038 A1 | 6/2011 | Chunilal | |
| 2011/0184960 A1* | 7/2011 | Delpha | G06Q 30/02 |
| | | | 707/754 |
| 2011/0191311 A1* | 8/2011 | Polonsky | G06F 17/30 |
| | | | 707/706 |
| 2011/0231488 A1 | 9/2011 | Xu | |
| 2011/0295612 A1 | 12/2011 | Donneau-Golencer et al. | |
| 2011/0307478 A1 | 12/2011 | Pinckney et al. | |
| 2012/0030553 A1* | 2/2012 | Delpha | G06F 17/241 |
| | | | 715/205 |
| 2012/0036523 A1* | 2/2012 | Weintraub | H04N 7/173 |
| | | | 725/9 |
| 2012/0054022 A1 | 3/2012 | Kosashvili | |
| 2012/0089623 A1 | 4/2012 | Sobotka et al. | |
| 2012/0110463 A1 | 5/2012 | Brolley et al. | |
| 2012/0143911 A1* | 6/2012 | Liebald | G06F 17/30702 |
| | | | 707/771 |
| 2012/0150972 A1* | 6/2012 | Morris | G06Q 50/00 |
| | | | 709/206 |
| 2012/0197813 A1 | 8/2012 | Kurtzig et al. | |
| 2012/0272164 A1 | 10/2012 | Polonsky et al. | |
| 2012/0311139 A1 | 12/2012 | Brave et al. | |
| 2012/0316940 A1 | 12/2012 | Moshfeghi | |
| 2012/0331052 A1 | 12/2012 | Rathod | |
| 2013/0073473 A1 | 3/2013 | Heath | |

(56) References Cited

U.S. PATENT DOCUMENTS

| | | | |
|---|---|---|---|
| 2013/0073568 A1* | 3/2013 | Federov | G06F 17/30867 |
| | | | 707/749 |
| 2013/0096937 A1 | 4/2013 | Campbell et al. | |
| 2013/0097246 A1 | 4/2013 | Lifroni et al. | |
| 2013/0124449 A1 | 5/2013 | Pinckney et al. | |
| 2013/0159325 A1 | 6/2013 | Polonsky et al. | |
| 2013/0166346 A1* | 6/2013 | Al-Zuhair | G06Q 10/0637 |
| | | | 705/7.28 |
| 2014/0006372 A1 | 1/2014 | Ickman et al. | |
| 2014/0038725 A1 | 2/2014 | Mizrahi et al. | |
| 2015/0046435 A1 | 2/2015 | Donneau-Golencer | |

* cited by examiner

METHODS AND SYSTEMS FOR MODIFYING A USER PROFILE FOR A RECOMMENDATION ALGORITHM AND MAKING RECOMMENDATIONS BASED ON USER INTERACTIONS WITH ITEMS

This application claims the benefit of U.S. provisional patent application No. 61/712,470 filed on Oct. 11, 2012 and is a continuation-in-part of commonly-owned U.S. patent application Ser. No. 13/528,029 filed on Jun. 20, 2012 (now U.S. Pat. No. 8,661,034), which is a continuation-in-part of commonly-owned U.S. patent application Ser. No. 12/658,192 filed on Feb. 3, 2010 (now abandoned). U.S. provisional patent application No. 61/712,470 is incorporated herein and made a part hereof by reference.

BACKGROUND OF THE INVENTION

The present invention relates to the field of item and peer recommendation algorithms directed towards industry professionals. More specifically, the present invention is aimed at providing a more accurate and iterative recommendation algorithm that is adaptable based on a continuum of user actions or inputs rather than based on binary yes/no signals.

Prior art recommendation algorithms typically rely on a user profile and a set of filters for matching the user profile to an item or object (such as a document, a web page, a presentation, an article, a chart or graphic, a product, or the like) or a peer (such as an expert, a colleague in the same or similar industry, a service provider, or the like).

In item-to-item, item-to-user and user-to-user recommendation algorithms, one of the biggest challenges is to profile users accurately so that the right set of recommendations can be made. Traditionally recommendation engines have been able to use a user's declared or explicit profile and also the user's web site behavioral profile. The user's explicit profile includes the information he provides; for example, during a registration process, whereas the user's implicit profile may include the user's web site behavior such as the key words he or she searched on, articles he or she buys, articles he or she looks at, peer discussions he or she participates in, and the like. Such prior art recommendation engines are based on a user's set profile and simple binary scoring of the users actions indicating whether an item was viewed/not viewed or used/not used (e.g., in the form of a 1/0 or Y/N score), which records are then smoothed via weightings and/or time decay functions for use in the recommendation engine.

It would be advantageous to be able to adapt a user's profile iteratively based on the continuous spectrum of the user's interactions with different items, so that the recommendations can be more specifically tailored to a particular user. It would be particularly advantageous if such adaptation of the user's profile could be based on feedback obtained from a user, including feedback based on a user's interaction with a recommended item or direct input from a user as reflected in their modification of an item.

The methods, apparatus, and systems of the present invention provide the foregoing and other advantages.

SUMMARY OF THE INVENTION

The present invention relates to the field of item and peer recommendation algorithms directed towards industry professionals. More particularly, the present invention relates to methods and apparatus for modifying a user profile for a recommendation algorithm in order to more specifically tailor content based on a user's interactions with previously recommended content. Methods and systems for providing recommendations using such a modifiable user profile are also provided.

In accordance with one example embodiment of the present invention, a computerized method for modifying a user profile for a recommendation algorithm is provided. In such an example embodiment, a user is provided with electronic access to an item. The item may comprise one of a document, an article, a chart, a graphic, a report, a web page, or the like. User interaction with the item is enabled. The user interaction with the item is then electronically tracked and stored. The user's user profile used by a recommendation engine is then modified based on the tracked user interactions.

The user interaction may comprise at least one of annotating, highlighting, modifying, customizing, adding comments to the item, and the like.

The user interaction may be enabled via an application service provider application or a downloadable software application.

A web page displaying the item may be enabled to be displayed as an interactive web page providing capabilities for at least one of entering annotations, entering comments, adding highlighting of text portions, making modifications to the item, and the like.

In one example embodiment, the method may further comprise saving the user modified item, recording details of the user interaction from the user modified item, and using the details of the user interaction to modify the user profile.

The details of the user interaction may comprise at least one of: a coordinate position of the annotation, modification, comment, or highlighting in the item; the content of the annotation, modification, comment, and highlighting; meta data describing the content being annotated, modified, commented on, or highlighted; meta data assigned to the annotation, modification, comment, or highlighting; results of sentiment analysis of the annotation, modification, comment, or highlighted content, and the like.

The user profile may be modified based on at least one of: key words taken from the annotation, modification, comment, or highlighted content; meta data describing the annotation, modification, comment; key words from the highlighted content; meta data of a highlighted section; meta data describing the item being modified in an info-graphic interface, and the like.

The user profile may be stored in a database and modified at least one of: periodically at defined intervals; after each user interaction; after a defined number of user interactions; after a number of user interactions supersede a predetermined threshold number of interactions, and the like.

The user may access the item via a web site, a mobile application, an interactive email, or the like. Alternatively, the item may be provided to the user via the recommendation engine, or the item may be accessed from a database.

In another example embodiment, the item may comprise an info-graphics chart with weighted data elements. The user interaction may comprise modification of one or more weights assigned to the data elements.

The info-graphics chart may comprise an X axis and a Y axis. The X axis and the Y axis may each correspond to weighted sums of sub scores along multiple sub-dimensions. Weights may be assigned to each sub-dimension. User modification of the weight for a particular sub-dimension may indicate a relative priority of the particular sub-dimension to the user.

User modification of the one or more weights may be enabled via an interactive graphics display comprising one of a slidebar for each of the weights, a clickable weight scale for selecting the desired weight for each sub-dimension, a user interface embedded in a web page providing the info-graphic, an editable table listing the weights for each sub-dimension, and the like.

At least one of items or peer recommendations may be provided to the user based on the modified user profile. Further, the items or peer recommendations provided to the user may be modified based on the modified user profile. For example, modifications to the items or peer recommendations may comprise at least one of highlighting of key words in a recommended document, creating a custom view in an info-graphics chart, re-ordering of text elements in the recommended document, inserting annotations into an item, cropping or customizing of the info-graphics chart, providing customized contextualized comments to the recommendations which relates the recommendations to the modified user profile, re-ordering a list of recommendations, or the like.

The user profile in an unmodified state may comprise at least one of an explicit profile comprising data entered by the user and an implicit profile comprising information obtained from user behavior. The user behavior may comprise at least one of key words used in key word searches, articles reviewed, web pages reviewed, articles purchased, discussions reviewed, discussions participated in, peer profiles selected for connection, articles or web pages saved or downloaded, items clicked on in an info-graphics chart, and the like.

In accordance with the present invention, an apparatus for modifying a user profile for a recommendation algorithm is also provided. The apparatus may comprise a user interface adapted to provide a user with electronic access to an item and adapted to enable user interaction with the item. The item may comprise one of a document, an article, a chart, a graphic, a report, a web page, or the like. The apparatus may also comprise a software application for electronically tracking the user interaction with the item, a database for storing the user interaction with the item, and a database for storing a user profile. The software application is adapted to modify the user profile based on the tracked user interactions. The modified user profile may then be used by a recommendation engine to serve items or peer recommendations to the user tailored to the modified user profile.

The above-described apparatus may also include or enable additional features discussed above in connection with the various embodiments of the methods for modifying a user profile.

In addition, the present invention also encompasses methods and systems for providing recommendations using a continuously modifiable user profile. In one example embodiment of such a method, an initial user profile is entered and a user is provided with electronic access to an item. The item may comprise one of a document, an article, a chart, a graphic, a report, a web page, or the like. User interaction with the item is enabled. The user interaction with the item is electronically tracked and stored. The initial user profile may then be modified based on the tracked user interactions. One or more items or peer recommendations can then be served to the user based on the modified user profile.

In an example embodiment of a system for providing recommendations using a continuously modifiable user profile, the system may comprise a user interface providing a user with electronic access to an item and enabling user interaction with the item. The item may comprise one of a document, an article, a chart, a graphic, a report, a web page, or the like. A software application is provided for electronically tracking the user interaction with the item. A database is provided for storing the user interaction with the item. A database is also provided for storing a user profile. A recommendation engine is provided for serving items to users based on the user profile. The software application modifies the user profile based on the tracked user interactions. The modified user profile is used by a recommendation engine to serve one or more items or peer recommendations to the user tailored to the modified user profile.

The one or more items or peer recommendations served to the user may be at least one of modified and customized by the recommendation engine based on the modifications to the user profile.

Such methods and systems for providing recommendations may implement the various embodiments of the methods for modifying a user profile discussed above.

BRIEF DESCRIPTION OF THE DRAWINGS

The present invention will hereinafter be described in conjunction with the appended drawing figures, wherein like reference numerals denote like elements, and:

FIG. 2B shows the item of FIG. 2A with a pop-up menu which facilitates annotations and highlighting of the item;

FIG. 2C shows the item of FIG. 2A with highlighting added;

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to the provision of the ability to continuously update, modify, supplement, and/or customize a user profile for use in a recommendation algorithm based on a user's interaction with an item or object that is either provided by the recommendation algorithm to the user or available to them otherwise, provided that the interaction of such item can be tracked or monitored (whether in real-time or subsequently) by the recommendation system. The user can also be provided with the ability to directly modify and customize certain elements of his/her profile, for example, by changing or modifying various weighting factors or reordering elements, as will be explained in more detail below.

It should be appreciated that the term "user" as used herein may be interpreted to mean an individual, a company, an association, an organization, a collection of individuals, or the like.

One example of a recommendation engine is disclosed in commonly-owned co-pending U.S. patent application Ser. No. 13/528,029 filed on Jun. 20, 2012 entitled Bi-Model Recommendation Engine for Recommending Items and Peers, which is respectfully incorporated herein and made a part hereof by reference. The present invention can be used in connection with the recommendation engine described in U.S. patent application no. Ser. No. 13/528,029.

Figure 1:
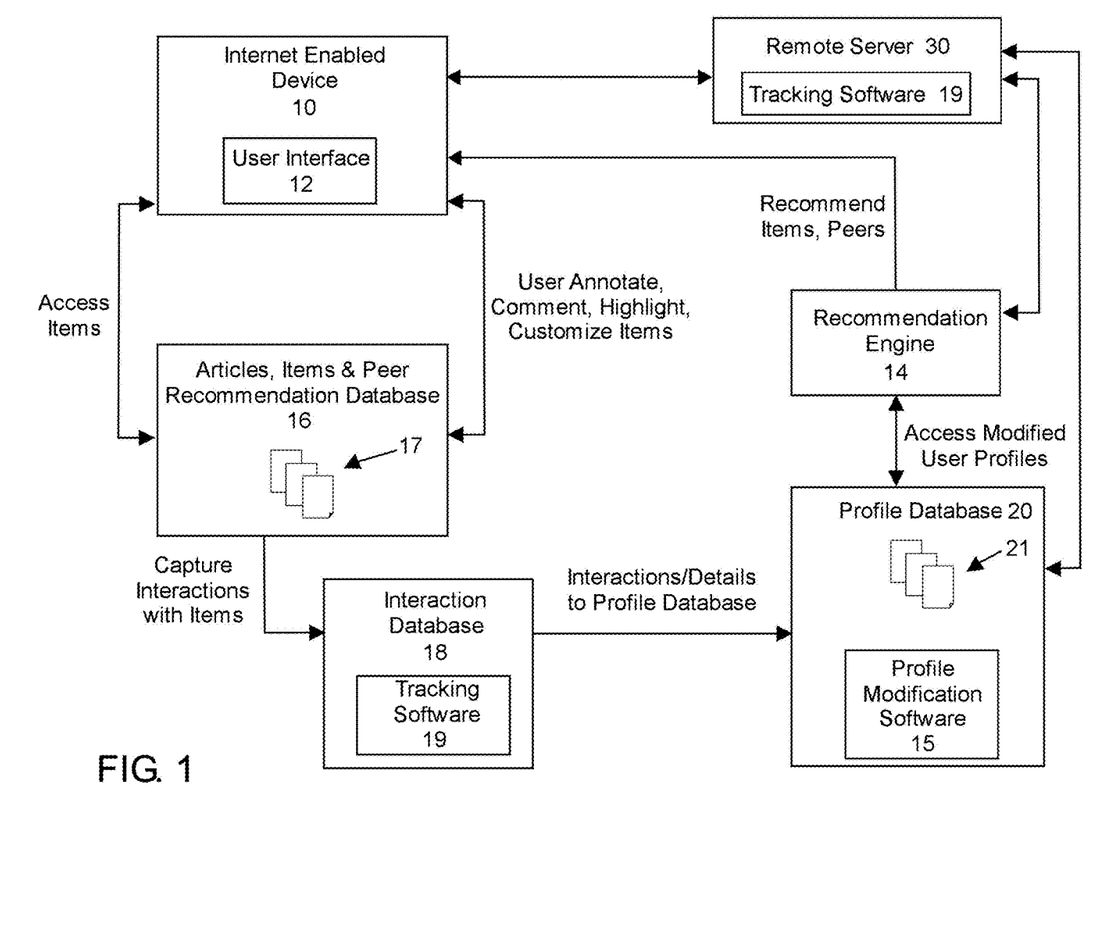
FIG. 1 shows a block diagram of an example embodiment of the present invention.

In one example embodiment of the present invention, a computerized method for modifying a user profile for a recommendation algorithm is provided. FIG. 1 shows an example embodiment of a system for implementing such a method. In one example embodiment, a user is provided with electronic access to an item 17 (e.g., via an Internet-enabled device 10 with a user interface 12). The item 17 may comprise one of a document, an article, a chart, a graphic, a report, a web page, a business document, or any type of modifiable electronic information item.

The user may access the item 17 via a web site, a mobile application, an interactive email, or the like via the Internet-enabled device 10. Alternatively, the item 17 may be provided to the user via a recommendation engine 14, or the item 17 may be accessed from a database 16 or other trackable source (e.g., remote server 30 or other Internet source).

Those skilled in the art should appreciate that the connections between the elements of FIG. 1 may be enabled via the Internet, and that the Internet enabled device 10 may be used to obtain items from other sources via the Internet, which items can then be modified by the user and processed by the system as discussed herein.

User interaction with the item 17 is enabled. The user interaction with the item 17 is then electronically tracked and stored (e.g., via an interaction database 18 and associated tracking software 19). The user's user profile 21 (e.g., stored in a profile database 20) used by the recommendation engine 14 may then be modified based on the tracked user interactions. Although the tracking software 19 is shown in FIG. 1 as part of the interaction database 18, those skilled in the art will appreciate that it can be implemented separately therefrom as long as it is in communication with both the interaction database 18 and profile database 20.

The user interaction may comprise at least one of annotating, highlighting, modifying, customizing, adding comments electronically within the item 17, or otherwise personalizing the item 17. The user interaction may be enabled via an application service provider application or a downloadable software application resident on the Internet-enabled device 10. The Internet enabled device 10 may comprise a computer, laptop, personal computing device, tablet, e-book reader, smart phone, or the like.

Figure 2A:
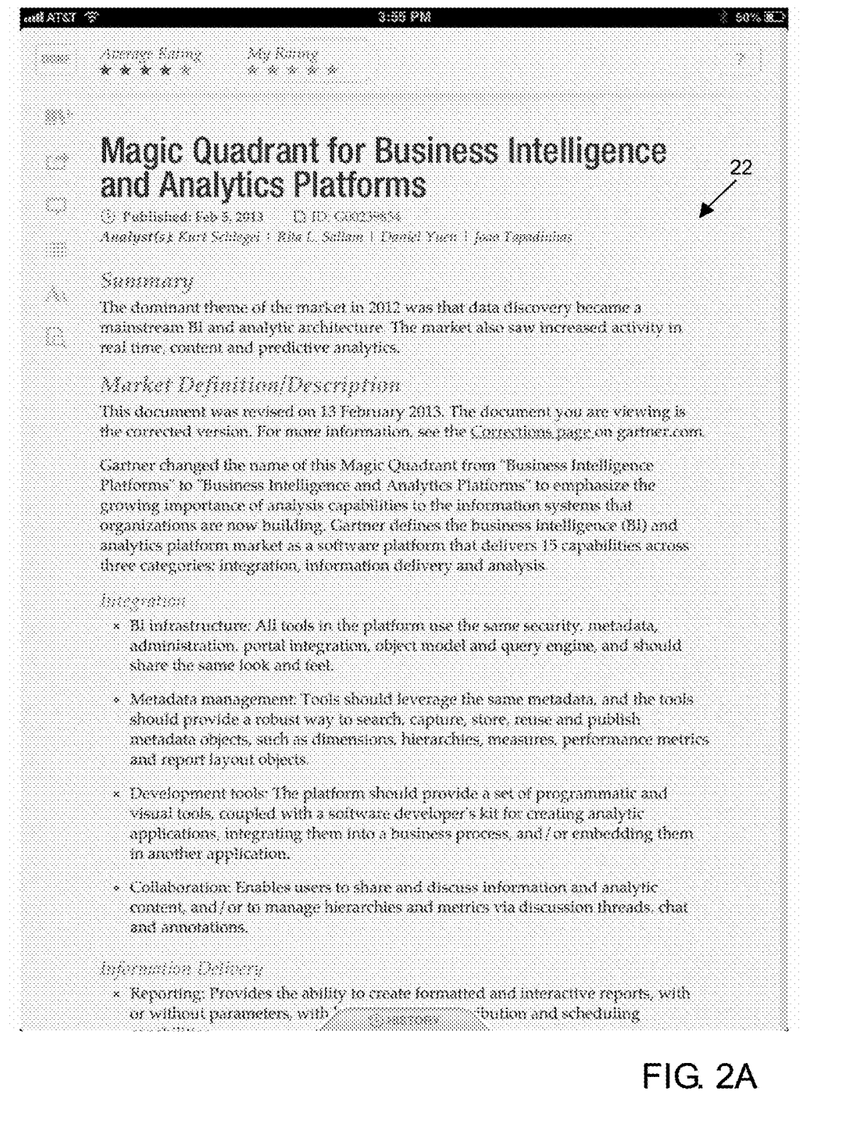
FIG. 2A shows an example of an item loaded on an interactive web page in original form.
Figure 2D:
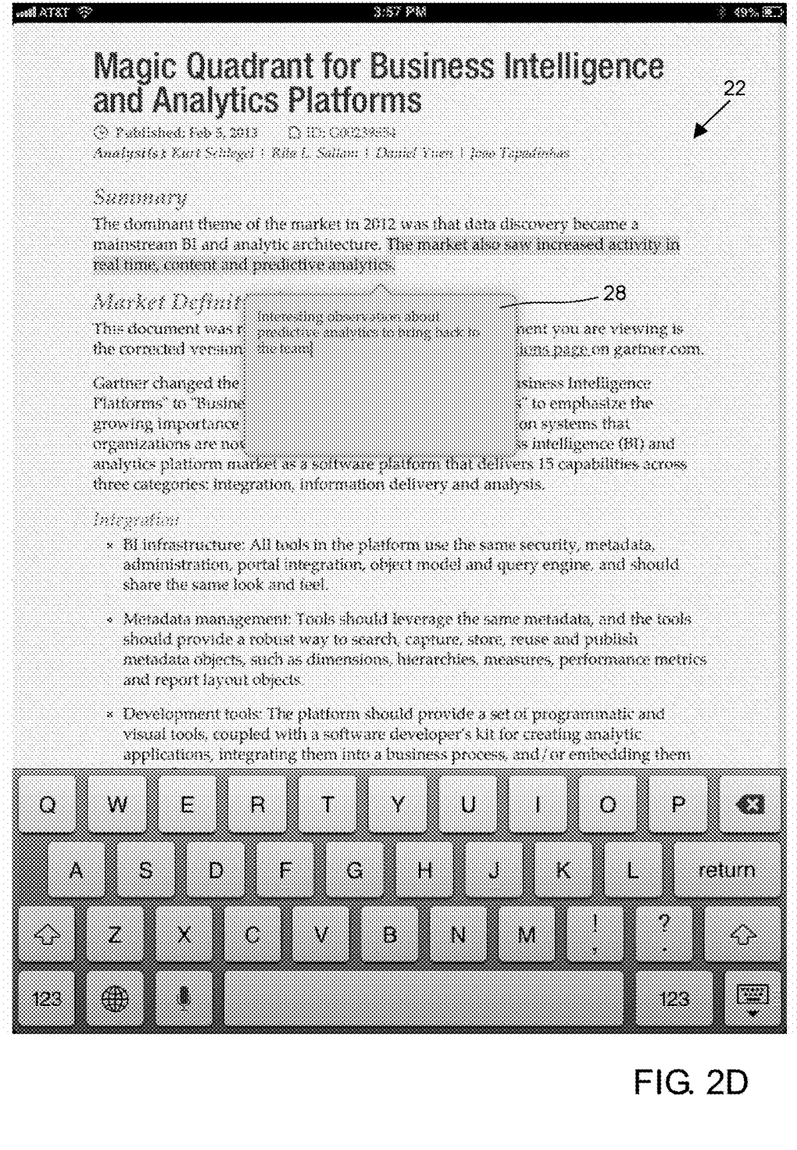
FIG. 2D shows the item of FIG. 2A with a note being added.
Figure 2E:
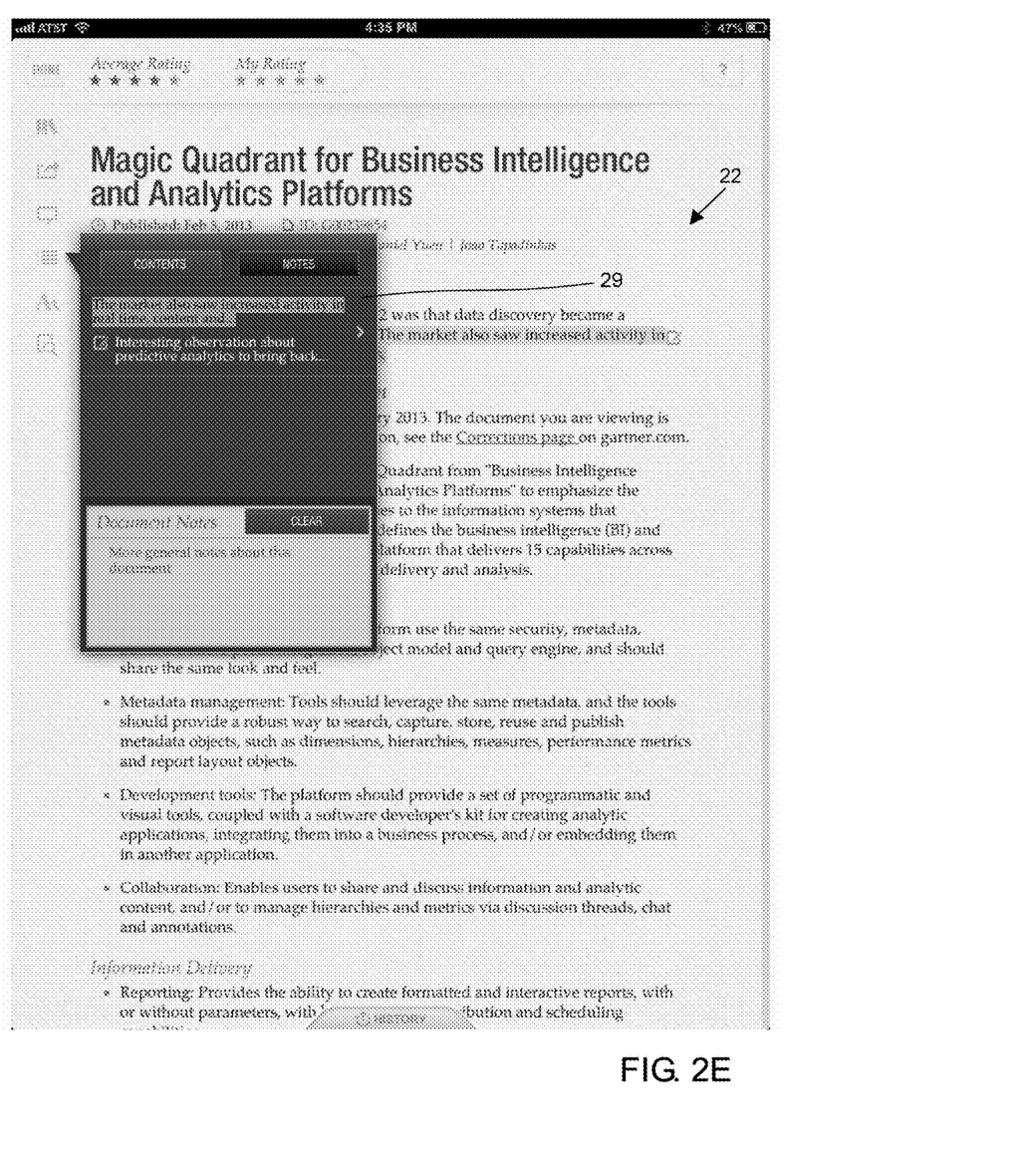
FIG. 2E shows the item of FIG. 2A with an aggregation function.

A web page displaying the item 17 may be enabled to be displayed as an interactive web page providing capabilities for at least one of entering annotations, entering comments, adding highlighting of text portions, making modifications to the item, and the like. For example, when viewing the item, the user may click on an "annotate" icon, which causes the page being viewed to be displayed as an interactive page with editorial functions consistent with the present invention, including highlighting, annotating, modifying, customizing, commenting, and the like. FIGS. 2A-2E illustrate one example embodiment of modifying an item displayed as an interactive web page. FIG. 2A shows an original item, which in the example shown is an article 22, in an unmodified state. FIG. 2B shows the article 22 with a pop-up menu 24 once text is selected (e.g., via highlighting with a mouse or similar tool), which enables either insertion of permanent highlighting or annotating. FIG. 2C shows the article 22 with permanent highlighting 26 added by the user. FIG. 2D shows the article 22 with a note 28 being added by the user. FIG. 2E shows the article 22 with a aggregation function 29 that aggregates all modifications made to the article 22 (which in the example shown includes the highlighted text and corresponding note) and allows for additional notes regarding the article 22 in general.

In one example embodiment, the method may further comprise saving the user modified item 17 (e.g., in database 16), recording details of the user interaction from the user modified item 17 (e.g., in interaction database 18), and using the details of the user interaction to modify the user profile 21, which may be stored in the profile database 20.

The details of the user interaction stored in the interaction database 18 may comprise at least one of: a coordinate position of the annotation, modification, comment, or highlighting in the item; the content of the annotation, modification, comment, and highlighting; meta data describing the content being annotated, modified, commented on, or highlighted; meta data assigned to the annotation, modification, comment, or highlighting; results of sentiment analysis of the annotation, modification, comment, or highlighted content, and any similar methods which capture the essence of the modification.

The user profile 21 may be modified based on at least one of: key words taken from the annotation, modification, comment, or highlighted content; meta data describing the annotation, modification, comment; key words from the highlighted content; meta data of a highlighted section; meta data describing the item being modified in an info-graphic interface, and the like.

Alternatively, once the user has completed reviewing and modifying the item 17, the annotated item 17 is saved on a remote server 30 (rather than database 16) for future use (both by the user and by the recommendation engine 14). The remote server 30 may then record the annotation details as discussed above and save this information under a user ID. The user can also save the item locally (on the Internet-enabled device 10 or a storage device associated therewith) as a PDF file for printing and sharing purposes. In such an embodiment, the remote server 30 may also include tracking software 19 and be in communication with both the recommendation engine 14 and the profile database 20, such that the user profiles can be updated in the same manner as discussed above. It should be appreciated that, although the recommendation engine 14 and other components shown in FIG. 1 are shown as separate functional units, any one or more of the components shown in FIG. 1 (other than the Internet enabled device 10 and user interface 12) can be consolidated into one functional unit. For example, the recommendation engine 14, the database 16, the interaction database 18, and/or the profile database 20 can be implemented as part of the remote server 30. It is also contemplated that a document or other item may be annotated "off line" apart from the system or the corresponding software application, and later uploaded to the system and/or stored at the database 16 or server 30. The annotation details can then be processed as discussed above.

The user profile 21 may be stored in the profile database 20 and modified at least one of: periodically at defined intervals; after each user interaction; after a defined number of user interactions; after a number of user interactions supersede a predetermined threshold number of interactions, and the like. Software 15 for use in modifying the user profile may be provided in the profile database 20. Although the profile modification software 15 is shown in FIG. 1 as part of the profile database 20, those skilled in the art will appreciate that it can be implemented separately therefrom and be in communication with the interaction database 18 and/or the tracking software 19 and the profile database 20.

Figure 3:
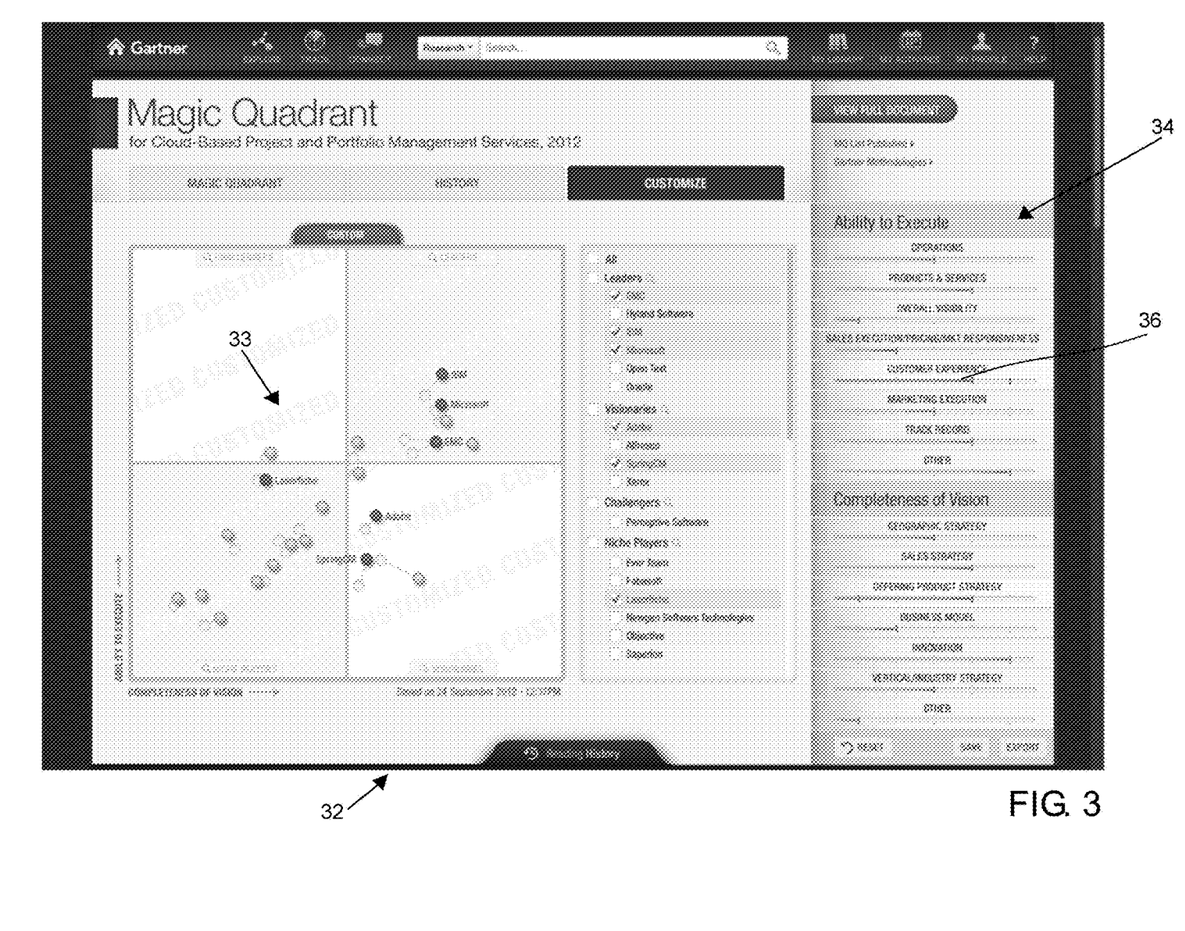
FIG. 3 shows an example of an info-graphics chart with user modifiable weighting functions in accordance with an example embodiment of the present invention.

In another example embodiment as shown in FIG. 3, the item 17 may comprise an info-graphics chart 32 with weighted data elements 33. The user interaction may comprise modification of one or more weights 34 assigned to the data elements 33. Changing weights assigned to the data elements 33 in the chart 32 results in a change in the element position in the chart 32.

As shown in FIG. 3, the info-graphics chart may comprise an X axis and a Y axis. The X axis and the Y axis may each correspond to weighted sums of sub scores along multiple sub-dimensions. Weights may be assigned to each sub-dimension. User modification of the weight 34 for a particular sub-dimension may indicate a relative priority of the particular sub-dimension to the user.

User modification of the one or more weights may be enabled in a variety of ways. For example, as shown in FIG. 3, user modification of the one or more weights may be enabled via an interactive graphics display comprising a slidebar 36 for each of the weights, or alternatively, via one of a clickable weight scale for selecting the desired weight for each sub-dimension, a user interface embedded in a web page providing the info-graphic, an editable table listing the weights for each sub-dimension, or any similar info-graphics methods for modifying weights and/or scores. The starting position of the graphic (scale, chart, etc.) represents the system assigned weightings.

FIG. 3 shows the example info-graphics chart 32 as the Magic Quadrant chart developed by Gartner, Inc. The Magic Quadrant chart depicts markets in the middle phases of their life cycle by using a two-dimensional matrix that evaluates vendors based on their completeness of vision and ability to execute. The Magic Quadrant uses weighted criteria 34 that plot vendors based on their relative strengths in the market. This Gartner, Inc. model is well suited for high-growth and consolidating markets where market and vendor differentiations are distinct. For example, the coordinate of a map element (e.g., vendor position in a quadrant (represented by data elements 33)) is determined by a calculated X and Y score which are by themselves a weighted sum of sub-scores along multiple sub dimensions. The X and Y scores may relate to a vendors completeness of vision and ability to execute. The completeness of vision score may be based on the following sub-dimensions: the vendor's market understanding, marketing strategy, sales strategy, offering or product strategy, business model, vertical/industry strategy, innovation, geographic strategy, and the like. The ability to execute score may be based on the following sub-dimensions: the vendor's products or services, overall visibility, sales execution and pricing, market responsiveness, track record, marketing execution, customer experience, operations, and the like. Other sub-dimension factors may of course be considered for each. Weightings may be provided for the sub-dimensions based on the importance of each factor in the overall score as determined by Gartner (or other provider of an info-graphics chart).

While the above-embodiments of present invention are described herein in connection with Gartner's Magic Quadrant, those skilled in the art should appreciate that it can be applied to any info-graphics chart from any provider, as well as to any type of business metric, graph, table, or the like where weighting factors and/or scores are used.

For example, with the present invention, the user may receive a recommendation to access, or otherwise accesses or views, a Magic Quadrant or other info-graphics chart (e.g., via an interactive web page or a software application), which provides the Gartner view with the Gartner calculated coordinates, and the user is allowed to create a custom view by modifying the weights 34 for each of the sub dimensions, and hence, recalculating vendor positions along X and Y coordinates. For example, the user may feel that the sub-dimension "sales execution and pricing" is of critical importance, and increase the weighting factor applied to this sub-dimension, resulting in vendors having a higher score in this area being given an upgraded position in the Magic Quadrant. The system then records and saves the customized view in the user's extended profile or a similar table, which can then be applied to further recommendations for that user.

It should be appreciated that access to the info-graphics, such as the Magic Quadrant, can be provided in a variety of ways, including but not limited to via an interactive web page or a software application (either provided remotely via an application service provider or a downloadable application resident on a computer, laptop, personal computing device, tablet, e-book reader, smart phone, or the like).

Once the user has adjusted the weightings 34, the resultant custom view of the info-graphics is saved for future use, for example on a database 16 or remote server 30. The database 16 or remote server 30 records the custom weight table for the particular user, for example under an info-graphic ID assigned to that user as part of the user profile 21 (as described above).

It is also contemplated that the info-graphics may be modified "off line" apart from the system or the corresponding software application, and later uploaded to the system and/or stored at the database 16 or server 30. The changes in the weighting details can then be processed as discussed above.

At least one of items or peer recommendations may be provided from the recommendation engine 14 to the user based on the modified user profile 21. Further, the items or peer recommendations provided to the user may be modified based on the modified user profile 21. For example, modifications to the items or peer recommendations may comprise at least one of highlighting of key words in a recommended document, creating a custom view in an info-graphics chart, re-ordering of text elements in the recommended document, inserting annotations into an item, cropping or customizing of the info-graphics chart, providing customized contextualized comments to the recommendations which relates the recommendations to the modified user profile, re-ordering a list of recommendations, or the like.

The user profile 21 in an unmodified state may comprise at least one of an explicit profile comprising data entered by the user and an implicit profile comprising information obtained from user behavior. The user behavior may comprise at least one of key words used in key word searches, articles reviewed, web pages reviewed, articles purchased, discussions reviewed, discussions participated in, peer profiles selected for connection, articles or web pages saved or downloaded, items clicked on in an info-graphics chart, and the like.

Figure 4:
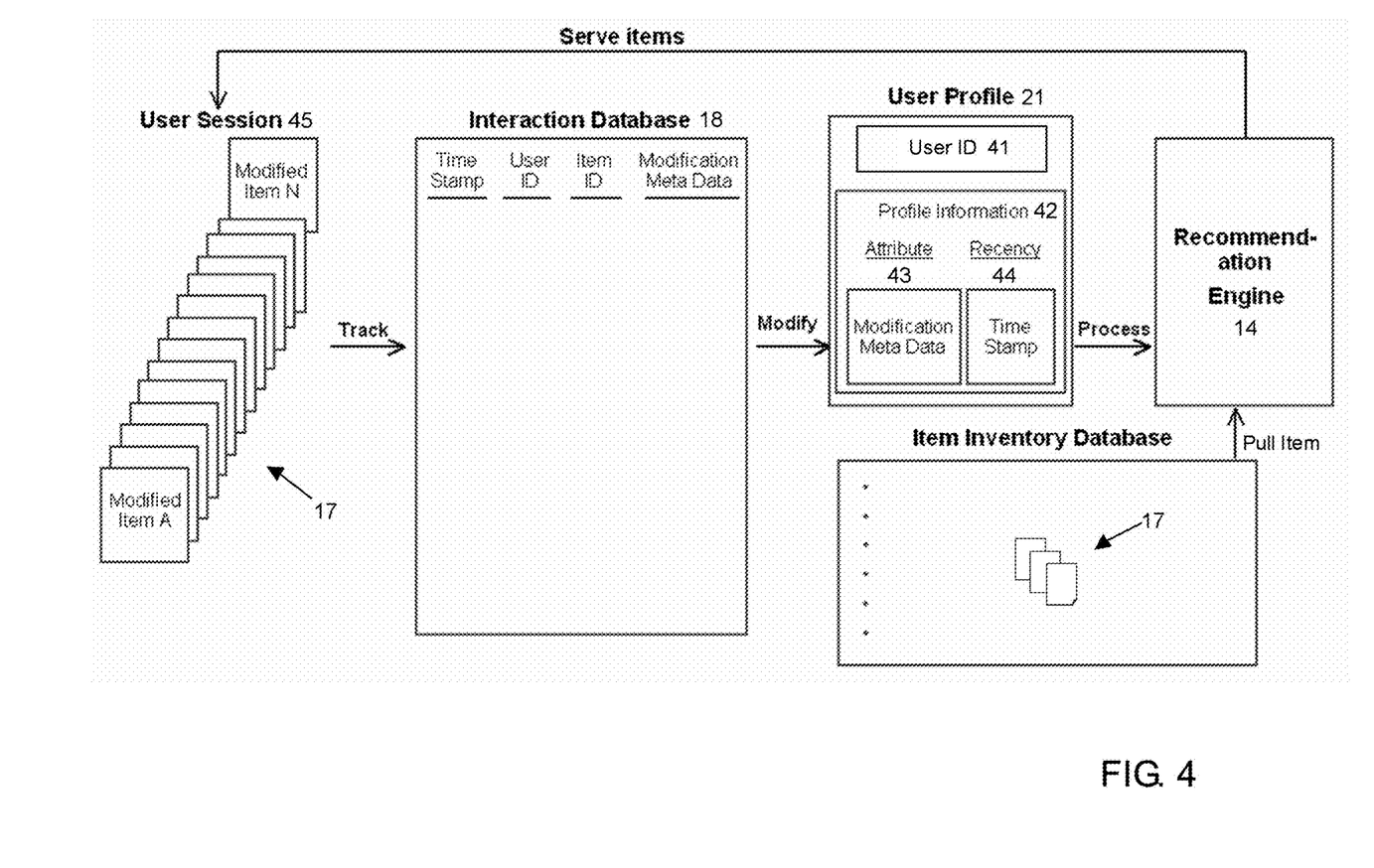
FIG. 4 shows a flow diagram of an example embodiment of the present invention.

In addition, the present invention also encompasses methods and systems for providing recommendations using a continuously modifiable user profile. FIG. 4 shows a flow diagram of one example embodiment of such a method. An initial user profile 21 is entered and a user is provided with electronic access to an item 17 via the recommendation engine 14. The user profile 21 may include a user ID 41 and other profile information 42. To enable modification of the user profile 21, the user profile may have the capability to maintain modifiable fields relating to profile attributes (such as meta data or other information used to modify the user profile 21 as discussed above) as well as recency of any such modifications (e.g., such as a time stamp of the most recent modification to the user profile 21). As discussed above, the item 17 may comprise one of a document, an article, a chart, a graphic, a report, a web page, or any type of modifiable electronic information item. User interaction with the item is enabled as discussed above in connection with FIG. 1. For example, the user may initiate a user session 45 with the recommendation engine 14. The user interaction with the item 17 is electronically tracked and stored in the interaction database 18 (e.g., via associated tracking software 19 shown in FIG. 1). The interaction database 18 may also track and store a time stamp for the modification to each item, the user ID, the item ID for each item, and the modification meta data (or other details of the interaction as discussed above). The initial user profile 21 may then be modified based on the tracked user interactions. For example, the profile modification software 15 (shown in FIG. 1) may modify the attributes field 43 and the recency field 44 of the user profile 21 based on the received interaction details. One or more items 17 or peer recommendations can then be served to the user based on the modified user profile 21.

The one or more items 17 or peer recommendations served to the user may be at least one of modified and customized by the recommendation engine 14 based on the modifications to the user profile 21. For example, it can highlight key words in a new item it serves in advance, based on the user's recorded recent highlights. In another example, the recommendation engine may also create a custom view in a new Magic Quadrant it serves based on the user's recently recorded custom weights. Additional modifications to recommended items may also be provided by the recommendation engine based on the modified user profile, such as re-ordering of text or elements of an item, inserting annotations into an item that relate to a user's comments or annotations in a recently modified item, cropping and/or customizing info-graphics based on user's customization of similar graphics, as well as other conceivable modifications.

Such methods and systems for providing recommendations may implement the various embodiments of the methods for modifying a user profile discussed above.

It should be appreciated that the process described above in connection with FIG. 4 is iterative such that the user profile is continuously updated based on user interactions with items over time (e.g., over all user sessions 45) so that the items and recommendations served by the recommendation engine are continuously tailored to the user and the users evolving preferences and interests.

With the present invention, the user's interests and priorities at a given point of time are implicitly and explicitly derived from the richness provided by the spectrum of the user's recent interactions with, and modifications of, an information item or items. Inputs such as annotations, highlights, saved comments, and modifications of info-graphics, provide valuable data about the user's interests and priorities beyond the value provided by the binary signals already available (for example, coordinates of highlighted paragraphs vs. a binary signal "read the document=yes"). This data, once aggregated, tabulated, prioritized (by date, significance, depth of interaction, etc.), and mapped to the relevant taxonomy, can be used in order to calculate to time-sensitive relevancy of related information items (articles, charts, peer profiles, event announcements, news items, etc.) to be recommended to a given user at a given time point. It can also be used to define user clusters to be used in collaborative filtering and other recommendation logic.

It should now be appreciated that the present invention provides advantageous methods and systems for providing more targeted items and peer recommendations from a recommendation algorithm. In particular, it should be appreciated that the present invention moves away from the limited binary scoring of prior art recommendation engines to a more iterative approach based on a continuum of inputs from the user's interaction with and/or modifications to an item (rather than simply whether an item was used/viewed). Although the invention has been described in connection with various illustrated embodiments, numerous modifications and adaptations may be made thereto without departing from the spirit and scope of the invention as set forth in the claims.

What is claimed is:

1. A computerized method for providing recommendations from a recommendation engine using an implicit profile of a user which implicit profile is continuously modifiable, comprising:

providing the user with access to the recommendation engine for providing recommended items and peers in response to a user inquiry on a specific topic;

storing an explicit profile and the implicit profile for the user in a profile database associated with the recommendation engine;

providing the user with electronic access to the recommended items in response to the user inquiry, the recommended items comprising at least one of a document, an article, a chart, a graphic, a report, and a web page, the recommended items being maintained in at least one of a private recommendation engine database and a remote server in communication with the recommendation engine;

enabling user interaction with an accessed item selected from the recommended items;

electronically tracking the user interaction with the accessed item;

recording details of the user interaction with the accessed item;

prioritizing the details of the user interaction based on at least one of recency of the user interaction, significance of the user interaction, and depth of the user interaction;

modifying the implicit profile based on the prioritized details of the user interaction;

determining at least one other user to be an expert peer having expertise relating to the specific topic based on the implicit profile or the modified implicit profile of the at least one other user; and providing at least one or more expert peer recommendations to the user based on at least one of the implicit profile or the modified implicit profile of the user and the implicit profile or the modified implicit profile of the expert peer;

wherein:

the explicit profile comprises data provided by the user to the recommendation engine;

the implicit profile in an unmodified state comprises information obtained from user behavior;

the information obtained from the user behavior comprises one or more of key words used in key word searches, articles reviewed, web pages reviewed, articles purchased, discussions reviewed, discussions participated in, peer profiles selected for connection, articles or web pages saved or downloaded, and items clicked on in an info-graphics chart;

the user interaction comprises at least one of annotating, highlighting, modifying, customizing, and adding comments to the accessed item;

the details of the user interaction comprise at least one of: meta data describing the accessed item being annotated, modified, customized, commented on, or highlighted; meta data assigned to the annotation, modification, customization, comment, or highlighting; and results of sentiment analysis of the annotation, modification, customization, comment, or highlighted content;

the implicit profile comprises a modifiable attributes field and a modifiable recency field; and the modifying of the implicit profile based on the prioritized details of the user interaction comprises modifying the attributes field to include the details of the user interaction and modifying the recency field to include a time stamp corresponding to a time of the user interaction.

2. A method in accordance with claim 1, wherein the user interaction is enabled via an application service provider application or a downloadable software application.

3. A method in accordance with claim 1, further comprising:
enabling a web page displaying the accessed item to be displayed as an interactive web page providing capabilities for at least one of entering annotations, entering comments, adding highlighting of text portions, and making modifications to the accessed item.

4. A method in accordance with claim 3, further comprising:
saving the user modified accessed item.

5. A method in accordance with claim 1, wherein the details of the user interaction further comprise at least one of: a coordinate position of the annotation, modification, comment, or highlighting in the accessed item; the content of the annotation, modification, comment, and highlighting.

6. A method in accordance with claim 5, wherein the implicit profile is modified based on at least one of: key words taken from the annotation, modification, comment, or highlighted content; meta data describing the annotation, modification, or comment; key words from the highlighted content; meta data of a highlighted section; and meta data describing the accessed item being modified in an info-graphic interface.

7. A method in accordance with claim 1, wherein the implicit profile is modified at least one of: periodically at defined intervals; after each user interaction; after a defined number of user interactions; and after a number of user interactions supersede a predetermined threshold number of interactions.

8. A method in accordance with claim 1, wherein one of: the user accesses the recommendation engine via a web site, a mobile application, or interactive email; the recommended item is provided to the user via the recommendation engine; and the recommended item is accessed from the recommendation engine database.

9. A method in accordance with claim 1, wherein:
the accessed item comprises an info-graphics chart with weighted data elements;
the user interaction comprises modification of one or more weights assigned to the data elements.

10. A method in accordance with claim 9, wherein:
the info-graphics chart may comprise an X axis and a Y axis;
the X axis and the Y axis each correspond to weighted sums of sub scores along multiple sub-dimensions;
weights are assigned to each sub-dimension;
user modification of one or more of the weights for a particular sub-dimension indicates a relative priority of the particular sub-dimension to the user.

11. A method in accordance with claim 10, wherein:
the user modification of the one or more weights is enabled via an interactive graphics display comprising one of a slidebar for each of the weights, a clickable weight scale for selecting the desired weight for each sub-dimension, a user interface embedded in a web page providing the info-graphic, and an editable table listing the weights for each sub-dimension.

12. A method in accordance with claim 1, further comprising:
providing one or more additional recommended items to the user based on the modified implicit profile.

13. A method in accordance with claim 12, wherein the one or more additional recommended items or the peer recommendations provided to the user are modified based on the modified implicit profile.

14. A method in accordance with claim 13, wherein modifications to the one or more additional recommended items or the peer recommendations comprise at least one of highlighting of key words in a recommended document, creating a custom view in an info-graphics chart, re-ordering of text elements in the recommended document, inserting annotations into the one or more additional recommended items, cropping or customizing of the info-graphics chart, providing customized contextualized comments to the recommendations which relates the recommendations to the modified implicit profile, and re-ordering a list of recommendations.

15. A system for providing recommendations from a recommendation engine using an implicit profile of a user which implicit profile is continuously modifiable, comprising:
the recommendation engine for providing recommended items and peers in response to a user inquiry on a specific topic;
a profiles database associated with the recommendation engine for storing an explicit profile and the implicit profile for the user;
at least one of a private recommendation engine database and a remote server in communication with the recommendation engine for storing and maintaining the recommended items;
a user interface providing the user with electronic access to the recommended items via the recommendation engine in response to the user inquiry, the recommended items comprising at least one of a document, an article, a chart, a graphic, a report, and a web page, and enabling user interaction with an accessed item selected from the recommended items;
a software application for electronically tracking the user interaction with the accessed item;
a database for storing details of the user interaction with the accessed item;
wherein:
the details of the user interaction are prioritized based on at least one of recency of the user interaction, significance of the user interaction, and depth of the user interaction;

the software application modifies the implicit profile based on the prioritized details of the user interaction;

the recommendation engine determines at least one other user to be an expert peer having expertise relating to the specific topic based on the implicit profile or the modified implicit profile of the at least one other user;

the modified implicit profile is used by the recommendation engine to serve one or more expert peer recommendations to the user based on at least one of the implicit profile or the modified implicit profile of the user and the implicit profile or the modified implicit profile of the expert peer;

the explicit profile comprises data provided by the user to the recommendation engine;

the implicit profile in an unmodified state comprises information obtained from user behavior;

the information obtained from the user behavior comprises one or more of key words used in key word searches, articles reviewed, web pages reviewed, articles purchased, discussions reviewed, discussions participated in, peer profiles selected for connection, articles or web pages saved or downloaded, and items clicked on in an info-graphics chart;

the user interaction comprises at least one of annotating, highlighting, modifying, customizing, and adding comments to the accessed item;

the details of the user interaction comprise at least one of: meta data describing the accessed item being annotated, modified, customized, commented on, or highlighted; meta data assigned to the annotation, modification, customization, comment, or highlighting; and results of sentiment analysis of the annotation, modification, customization, comment, or highlighted content;

the implicit profile comprises a modifiable attributes field and a modifiable recency field; and the modifying of the implicit profile based on the prioritized details of the user interaction comprises modifying the attributes field to include the details of the user interaction and modifying the recency field to include a time stamp corresponding to a time of the user interaction.

16. A computerized method for providing recommendations from a recommendation engine using an implicit profile of a user which implicit profile is continuously modifiable, comprising:

providing the user with access to the recommendation engine for providing recommended items responsive to a user inquiry on a specific topic and peers with expertise pertaining to the specific topic;

storing an explicit profile and the implicit profile of the user in a profile database associated with the recommendation engine;

providing the user with electronic access to the recommended items in response to the user inquiry, the recommended items comprising at least one of an interactive info-graphics chart or a document containing an interactive info-graphics chart, the recommended items being maintained in at least one of a private recommendation engine database and a remote server in communication with the recommendation engine;

enabling user interaction with the info-graphics chart;

electronically tracking and storing details of the user interaction with the info-graphics chart;

prioritizing the details of the user interaction based on at least one of recency of the user interaction, significance of the user interaction, and depth of the user interaction;

modifying the implicit profile based on the prioritized details of the user interaction; and serving one or more additional recommended items to the user based on the modified implicit profile, the one or more additional recommended items comprising one of an article, a chart, a graphic, a report, a web page, a peer recommendation, or a different document;

wherein:
the info-graphics chart comprises an X axis and a Y axis and an interactive graphics display enabling modification of one or more weights assigned to data elements represented in the info-graphics chart;

the explicit profile comprises data provided by the user to the recommendation engine;

the implicit profile in an unmodified state comprises information obtained from user behavior;

the information obtained from the user behavior comprises one or more of key words used in key word searches, articles reviewed, web pages reviewed, articles purchased, discussions reviewed, discussions participated in, peer profiles selected for connection, articles or web pages saved or downloaded, and items clicked on in an info-graphics chart;

the user interaction comprises at least modifying of the one or more weights assigned to the data elements in the info-graphics chart via the interactive graphics display;

the implicit profile comprises a modifiable attributes field and a modifiable recency field; and the modifying of the implicit profile based on the prioritized details of the user interaction comprises modifying the attributes field to include the details of the user interaction and modifying the recency field to include a time stamp corresponding to a time of the user interaction.

17. A method in accordance with claim 16, wherein the recommended items or the one or more additional recommended items served to the user are at least one of modified and customized by the recommendation engine based on the modifications to the implicit profile.

18. A system for providing recommendations from a recommendation engine using an implicit profile of a user which implicit profile is continuously modifiable, comprising:

the recommendation engine for providing recommended items responsive to a user inquiry on a specific topic and peers with expertise pertaining to the specific topic;

a profile database associated with the recommendation engine for storing an explicit profile and the implicit profile for the user;

at least one of a private recommendation engine database and a remote server in communication with the recommendation engine for storing and maintaining the recommended items;

a user interface providing the user with electronic access to the recommended items via the recommendation engine in response to the user inquiry, the recommended items comprising at least one of an interactive info-graphics chart or a document containing an interactive info-graphics chart, and enabling user interaction with the info-graphics chart;

a software application for electronically tracking the user interaction with the info-graphics chart;

a database for storing details of the user interaction with the info-graphics chart;

wherein:
the info-graphics chart comprises an X axis and a Y axis and an interactive graphics display enabling modification of one or more weights assigned to data elements represented in the info-graphics chart;

the details of the user interaction are prioritized based on at least one of recency of the user interaction, significance of the user interaction, and depth of the user interaction;

the software application modifies the implicit profile based on the prioritized details of the user interaction; and the modified implicit profile is used by the recommendation engine to serve one or more additional recommended items to the user tailored to the modified implicit profile, the one or more additional recommended items comprising one of an article, a chart, a graphic, a report, a web page, a peer recommendation, or a different document;

the explicit profile comprises data provided by the user to the recommendation engine;

the implicit profile in an unmodified state comprises information obtained from user behavior;

the information obtained from the user behavior comprises one or more of key words used in key word searches, articles reviewed, web pages reviewed, articles purchased, discussions reviewed, discussions participated in, peer profiles selected for connection, articles or web pages saved or downloaded, and items clicked on in an info-graphics chart;

the user interaction comprises at least modifying of the one or more weights assigned to the data elements in the info-graphics chart via the interactive graphics display;

the implicit profile comprises a modifiable attributes field and a modifiable recency field; and the modifying of the implicit profile based on the prioritized details of the user interaction comprises modifying the attributes field to include the details of the user interaction and modifying the recency field to include a time stamp corresponding to a time of the user interaction.

19. A system in accordance with claim 18, wherein the recommended items or the one or more additional recommended items served to the user are at least one of modified and customized by the recommendation engine based on the modifications to the implicit profile.

20. A method in accordance with claim 16, wherein the implicit profile is modified at least one of: periodically at defined intervals; after each user interaction; after a defined number of user interactions; and after a number of user interactions supersede a predetermined threshold number of interactions.

21. A method in accordance with claim 16, wherein:
the X axis and the Y axis each correspond to weighted sums of sub scores along multiple sub-dimensions;
the weights are assigned to each sub-dimension;
the modifying of the one or more of the weights for a particular sub-dimension indicates a relative priority of the particular sub-dimension to the user.

22. A method in accordance with claim 16, wherein:
the interactive graphics display comprises one of a slide-bar for each of the weights, a clickable weight scale for selecting the desired weight for each sub-dimension, and an editable table listing the weights for each sub-dimension.

* * * * *